United States Patent

Kobayashi et al.

[11] Patent Number: 4,862,063
[45] Date of Patent: Aug. 29, 1989

[54] ELECTROSTATIC CAPACITY-TYPE STROKE SENSOR AND DIELECTRIC MATERIAL THEREFOR

[75] Inventors: Hiroshi Kobayashi; Toshiro Ichikawa, both of Kanagawa, Japan

[73] Assignees: Nissan Motor Company, Limited, Yokohama; Atsugi Motor Parts Company, Limited, Atsugi, both of Japan

[21] Appl. No.: 121,244

[22] Filed: Nov. 16, 1987

[30] Foreign Application Priority Data

Nov. 14, 1986 [JP] Japan ............................. 61-174052[U]
Jan. 23, 1987 [JP] Japan ................................... 62-12478

[51] Int. Cl.$^4$ ...................... G01R 27/26; G08C 19/10
[52] U.S. Cl. ................................ 324/61 P; 324/61 R; 340/870.37; 73/118.1
[58] Field of Search ................ 324/61 R, 61 P; 340/870.37; 73/658, 11, 118.1; 361/293

[56] References Cited

U.S. PATENT DOCUMENTS

| | | | |
|---|---|---|---|
| 2,978,638 | 4/1961 | Wing et al. | 324/61 R |
| 3,596,592 | 8/1971 | Trissnak et al. | 324/61 R X |
| 3,928,796 | 12/1975 | Kaiser | 324/61 R |
| 4,206,401 | 6/1980 | Meyer | 324/61 R |
| 4,288,793 | 9/1981 | Lötscher | 340/870.37 |
| 4,408,253 | 10/1983 | Nishino et al. | 361/293 |
| 4,587,850 | 5/1986 | Moser | 73/658 |

FOREIGN PATENT DOCUMENTS 60-105422  7/1985  Japan .

Primary Examiner—Reinhard J. Eisenzopf
Assistant Examiner—Jack B. Harvey
Attorney, Agent, or Firm—Foley & Lardner, Schwartz, Jeffery, Schwaab, Mack, Blumenthal & Evans

[57] ABSTRACT

An electrostatic capacity-type stroke sensor is designed for measuring relative displacement between a cylindrical member and a rod member. The electrostatic capacity-type stroke sensor includes a conductive cylinder arranged coaxially to the cylindrical member and fixed to one of the cylindrical member and the rod member for movement therewith. An annular member movable with either the cylindrical member or the rod member and made of a dielectric material is provided opposite the conductive cylinder. The conductive cylinder and the dielectrical annular member are coupled for creating electric capacity magnitude which is variable depending upon the relative position thereof. The conductive cylinder and the dielectric annular member are arranged for relative movement according to relative movement of the cylindrical member and the rod member so that the electrostatic capacity is variable depending upon the relative position of the cylindrical member and the rod member.

28 Claims, 1 Drawing Sheet

ELECTROSTATIC CAPACITY-TYPE STROKE SENSOR AND DIELECTRIC MATERIAL THEREFOR

BACKGROUND OF THE INVENTION

1. Field of the Invention

The present invention relates generally to an electrostatic capacity-type stroke sensor for monitoring displacement stroke of a movable member. The invention also relates to a dielectric material suitable for use in electrostatic capacity-type sensors. Further, the invention relates to a stroke sensor suitable for monitoring relative displacement between a sprung mass and an unsprung mass in a vehicular suspension system.

2. Description of the Background Art

Electrostatic capacity-type sensors have been widely used for monitoring displacement of a movable member. For example, the electrostatic capacity-type stroke sensor has been employed for monitoring relative displacement between a vehicle body as a sprung mass and a vehicular suspension member as an unsprung mass. Such an electrostatic capacity-type stroke sensor has been disclosed in the Japanese Utility Model First (unexamined) Publication (Jikkai) Showa 60-105422. In the disclosed construction, the electrostatic capacity-type stroke sensor includes a cylindrical casing and a rod member displaceable relative to the cylindrical casing. The cylindrical casing and rod member are so arranged as to establish variable electrostatic capacity depending upon the relative position of the rod member and cylindrical casing. Namely, in the shown construction, the rod member and the cylindrical casing are made of an electrically conductive material. The conductive rod member and cylindrical casing are electrically isolated from each other. On the other hand, an electrically conductive cylindrical casing is arranged coaxially with the cylindrical casing and fitted onto the outer periphery of the cylindrical casing. This conductive casing serves as an opposing electrode for the cylindrical casing. The cylindrical casing is connected to a stroke detector circuit.

The rod member is electrically connected to the conductive casing via a brush slidingly in contact with the outer periphery of the rod member. The conductive casing is, in turn connected to the stroke detector circuit. With this construction, electrostatic capacity is established between the rod member and the cylindrical casing. Since this electrostatic capacity is variable depending upon the relative position of the rod member and the cylindrical casing according to a predetermined relationship therebetween, the magnitude of relative displacement of the rod member and the cylindrical casing can be derived by measuring the electrostatic capacity created therebetween.

Though such an electrostatic capacity-type stroke sensor allows precise measurement of the relative stroke of the rod member and the cylindrical casing and allows precise measurement of the relative position of the vehicle body and the suspension member, a drawback may be encountered with respect to durability. Such a drawback is created by use of a contact type electrical connection between the rod member and brush. Namely, as is well known, the rod member frequently strokes in bounding and rebounding directions when absorbing vehicle body motion and road shock input through vehicular wheels. Therefore, the rod member frequently slides relative to the brush to cause wearing or abrasion of the brush. Furthermore, a sliding resistance created between the rod member and the brush may cause variation of the electrostatic capacity to degrade precision of the measured stroke.

In addition, such a construction requires a brush in sliding contact with the rod member and a lubrication mechanism for providing satisfactory lubrication between the brush and the rod member. This makes the construction of the sensor too complicated.

SUMMARY OF THE INVENTION

Therefore, it is an object of the present invention to provide an electrostatic capacity-type stroke sensor which is durable for long use.

Another object of the invention is to provide an electrostatic capcity-type stroke sensor which is simplified in construction and which requires less production cost.

A further object of the invention is to provide a dielectric material having improved temperature dependence.

In order to accomplish the aforementioned and other objects, an electrostatic capacity-type stroke sensor, according to the present invention, is designed for measuring relative displacement between a cylindrical member and a rod member. The electrostatic capacity-type stroke sensor includes a conductive cylinder arranged coaxially to the cylindrical member and fixed to the cylindrical member and the rod member for movement therewith. An annular member movable with the cylindrical member and the rod member and made of a dielectric material is provided opposite to the conductive cylinder. The conductive cylinder and the dielectrical annular member are coupled for creating electric capacity which is variable depending upon the relative position thereof. The conductive cylinder and the dielectric annular member are arranged for relative movement according to relative movement of the cylindrical member and the rod member so that the electrostatic capacity is variable depending upon the relative position of the cylindrical member and the rod member.

When such an electrostatic capacity-type stroke sensor is applied for an automotive suspension system, the cylindrical member may be a cylindrical casing and the rod member is a rod member. With the electrostatic capacity-type stroke sensor, the relative displacement between the cylindrical casing and the rod member can be measured and relative displacement between a vehicle body and a suspension member rotatably mounting a vehicular wheel can be monitored.

In order to apply the electrostatic capcity-type stroke sensor, a dielectric material, according to the present invention, is composed of a synthetic resin as a base material and an inorganic material of high dielectric constant. The resin material and the inorganic material are selected to have opposite temperature characteristics with respect to dielectric constants. Such opposite temperature characteristics compensate each other to minimize temperature dependent variation of the dielectric constant for higher uniformity in a wide temperature range.

According to one aspect of the invention, an electrostatic capacity-type stroke sensor for monitoring relatively displaceable first and second structural members, comprises a cylindrical sensor casing secured to the first structural member and defining an internal sensor chamber therein, a rod member thrustingly disposed within the cylindrical sensor casing for displacement relative to the cylindrical sensor casing according to movement of the second structural member, a first electrode member fixed to the cylindrical casing and arranged within the sensor chamber and extending substantially in parallel to the axis of the rod member, the first electrode member forming a first electrode, and a second electrode member made of a dielectric material and movable with the rod member relative to the first electrode member and constituting a second electrode for establishing an electrostatic capacity with the first electrode member. The electrostatic capacity is variable depending upon the relative position of the first and second electrode members and is indicative of the relative position of the first and second structural members.

According to another aspect of the invention, an electrostatic capacity-type stroke sensor for monitoring relatively displacable first and second structural members, comprises a cylindrical sensor casing secured to the first structural member and defining an internal sensor chamber therein, a rod member thrustingly disposed within the cylindrical sensor casing for displacement relative to the cylindrical sensor casing according to movement of the second structural member, a first cylindrical member fixed to the cylindrical casing and arranged within the the sensor chamber and extending substantially in parallel to the axis of the rod member, the first cylindrical member forming a first electrode, and a second cylindrical member made of a dielectric material and coaxially arranged with the first cylindrical member for varying overlapping magnitude depending upon the relative position of the first and second structural members, the second cylindrical member being movable with the rod member relative to the first cylindrical member and constituting a second electrode for establishing an electrostatic capacity with the first cylindrical member. The electrostatic capacity is variable depending upon the overlapping magnitude of the first and second cylindrical members and is indicative of the relative position of the first and second structural members.

According to a further aspect of the invention, an electrostatic capacity-type stroke sensor for monitoring relatively displaceable first and second structural members, comprises a cylindrical sensor casing secured to the first structural member and defining an internal sensor chamber therein, a first sensor member rigidly connected with the first structural member, the first sensor member extending substantially in parallel to the axis of the cylindrical casing and forming a first electrode, and a second sensor member associated with the second structural member for displacement relative to the first sensor member according to relative displacement between the first and second structural members and made of a dielectric material constituting a second electrode, the second sensor member being coaxially arranged with the first sensor member for varying the overlapping magnitude depending upon the position of the first and second structural members, the second sensor member establishing an electrostatic capacity with the first sensor member. The electrostatic capacity is variable depending upon the overlapping magnitude with the first sensor member and is indicative of the relative position of the first and second structural members.

The second sensor member comprises a cylindrical member coaxially disposed within the cylindrical casing.

In the preferred construction, the sensor chamber defined in the cylindrical sensor casing, is sealingly enclosed and filled with a gaseous state dielectric material. The dielectric material forming the second electrode member is a synthetic resin. Preferably, the dielectric material forming the second electrode member is selected among polyacetal resin and polypropylene resin.

In a further preferred embodiment, the dielectric material forming the second electrode material is a composition of a synthetic resin and an inorganic material. The synthetic resin and the inorganic material have opposite dielectric variation characteristics depending upon temperature. The synthetic resin is selected among polypropylene, polyacetal, polybuthylene telephtalate and polyphnylene surfide. On the other hand, the inorganic material is a ceramic selected among mixed crystal system ceramics. The mixed crystal ceramics are $CaTiO_3$-$Bi_4Ti_3O_{12}$ system ceramics, $TiO_2$-$CaTiSiO_5$ system ceramics, $TiO_2$ system ceramics, and strontium titanate.

DESCRIPTION OF THE PREFERRED EMBODIMENT

Figure 1:
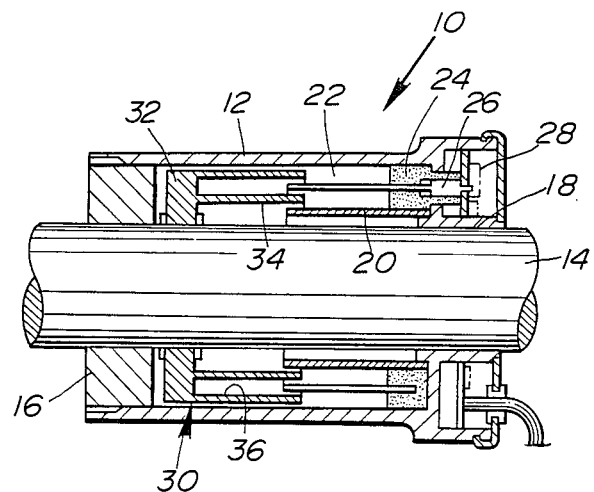
FIG. 1 is a schematic section of the preferred embodiment of an electrostatic capacity-type stroke sensor according to the invention, when it is applied to monitor relative displacement between a cylindrical member and a rod member.
Figure 2:
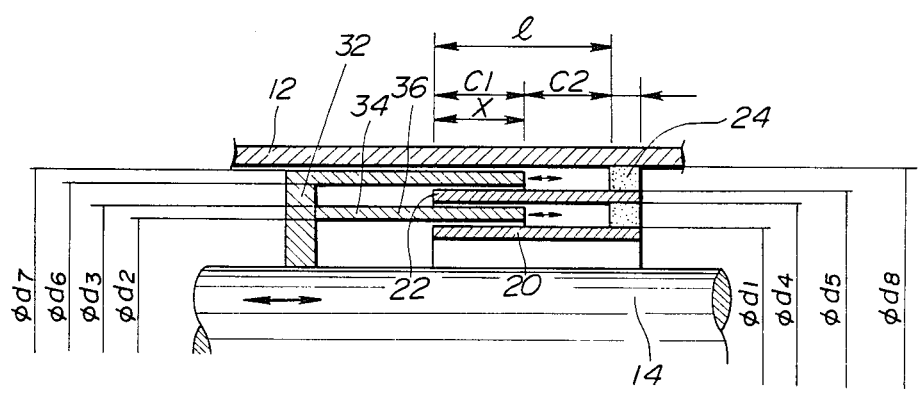
FIG. 2 is an enlarged section of the preferred embodiment of the electrostatic capacity-type stroke sensor of FIG. 1.

Referring now to the drawings, particularly to FIGS. 1 and 2, the preferred embodiment of a electrostatic capacity-type stroke sensor is generally represented by the reference numeral '10'. The electrostatic capacity-type stroke sensor 10 is designed for measuring relative stroke between a cylindrical member 12 and a rod member 14. In the shown construction, the rod member 14 is coaxially arranged through the cylindrical member 12 and thrustingly supported by means of supporting plug 16 and a cylindrical support section 18 integrally formed with the cylindrical member.

Both of the cylindrical member 12 and the rod member 14 are made electrically conductive material and, in turn, electrically isolated to each other.

Inner and outer cylinders 20 and 22 are coaxially disposed between the cylindrical member 12 and the rod member 14. The cylindrical member 12, the outer cylinder 22, the inner cylinder 20 and the rod member 14 are coaxially arranged in a spaced apart relationship and held in place by means of an annular support 24 which is made of an electrically insulative material.

The inner cylinder 20 is electrically connected to the cylindrical member 12 to constitute therewith a grounding electrode. On the other hand, the outer cylinder 22 is connected to a terminal 26 which is, in turn, connected to a sensor circuit 28. In the shown embodiment, the sensor circuit 28 comprises a RC oscillator. The outer cylinder 22 is designed to function as a positive electrode. The sensor circuit 28 is also connected to the grounding electrode formed by the inner cylinder 20 and the cylindrical member 12 to be grounded therethrough.

With the plug 16, the cylindrical supporting section and the insulative support 24 establishes a gas tight seal. A gaseous state dielectric material which has a stable dielectric constant fills the enclosed space.

On the other hand, a dielectric member 30 is provided for movement with the rod member 14. The dielectric member comprises a radially extending disk-shaped section 32 and coaxially arranged inner and outer cylindrical sections 34 and 36. The inner diameter $\phi d_2$ of the inner cylindrical section 34 of the dielectric member 30 is greater than the outer diameter $\phi d_1$ of the inner cylinder 20 and the outer diameter $\phi d_3$ is smaller than the inner diameter $\phi d_4$ of the outer cylinder 22 so that the inner cylindrical section 34 may enter into the annular space defined between the inner and outer cylinders 20 and 22, as shown in FIG. 2. On the other hand, the inner diameter $\phi d_6$ of the outer cylindrical section 36 is greater than the outer diameter $\phi d_5$ of the outer cylinder 22 and the outer diameter $\phi d_7$ is smaller than the inner diameter $\phi d_8$ of the cylindrical member 12 so that the outer cylindrical section may enter into the annular space defined between the outer cylinder 22 and the cylindrical member. On the other hand, the disk-shaped section 32 is rigidly fixed to the outer periphery of the rod member 14 so that the dielectric member 30 may be moved according to movement of the rod member 14.

With the construction set forth above, electrostatic capacity $C_t$ is created between the inner and outer cylinders 20 and 22 and the inner and outer cylindrical sections 34 and 36 of the dielectric member 30 while relative displacement between the cylindrical member 12 and the rod member 14 occurs.

Here, assuming the possible maximum relative stroke between the cylindrical member 12 and the rod member 14 is l, as shown in FIG. 2; the relative dielectric constant of the dielectric member is $\epsilon_2$; and the relative dielectric constant of the gaseous dielectric material is $\epsilon_1$. It is further assumed that the electrostatic capacity of the overlapping portion between the inner and outer cylindrical sections 34 and 36 and the inner and outer cylinders 20 and 22 is $C_1$; the electrostatic capacity of the portions of the inner and outer cylinders 20 and 22 outside of the inner and outer cylindrical sections 34 and 36 is $C_2$; and the electrostatic capacity of the portion where the inner and outer cylinders 20 and 22 are supported is $C_3$. In this case, the electrostatic capacities $C_t$, $C_1$ and $C_2$ can be respectively illustrated by the following equations:

$$C_t = C_1 + C_2 + C_3 \quad (1)$$

$$C_1 = 2\pi\epsilon_0 x[1/\{(1/\epsilon_2 - 1/\epsilon_1) \ln \cdot d_3/d_2 + 1/\epsilon_1 \cdot \ln d_4/d_1\} + \{1/(1/\epsilon_2 - 1/\epsilon_1) \ln \cdot d_7/d_6 + 1/\epsilon_1 \cdot \ln d_8/d_5\}] \quad (2)$$

$$C_2 = 2\pi\epsilon_0(1-x) \cdot [1/\{(1-\epsilon_1) \ln (d_4/d_1)\} + 1/\{(1-\epsilon_1) \ln (d_8/d_5)\}] \quad (3)$$

where $\epsilon_0$ is the dielectric constant in vacuum.
Here, it is assumed:

$$[1/\{(1/\epsilon_2 - 1/\epsilon_1) \ln \cdot d_3/d_2 + 1/\epsilon_1 \cdot \ln d_4/d_1\} + \{1/(1/\epsilon_2 - 1/\epsilon_1) \ln \cdot d_7/d_6 + 1/\epsilon_1 \cdot \ln d_8/d_5\}] = A;$$

and $$[1/\{(1-\epsilon_1) \ln (d_4/d_1)\} + 1/\{(1-\epsilon_1) \ln (d_8/d_5)\}] = B$$

A and B are both constant. The equations (2) and (3) can be modified utilizing A and B. The electrostatic constant $C_t$ can be illustrated by:

$$C_t = 2\pi\epsilon_0 x(A-B) + 2\pi\epsilon_0 lB + C_3 \quad (4)$$

As will be appreciated herefrom, the electrostatic constant $C_t$ is variable in proportion to the stroke x.

As set forth, the detector circuit comprises the RC oscillator whose ocillation cycle period can be described by:

$$T = (1/K)RC \quad (5)$$

where K is constant.
From this the frequency output characteristics of the RC oscillator can be described by:

$$T = (R/K)2\pi\epsilon_0 x(A-B) + C_0 \quad (6)$$

where $C_0 = 2\pi\epsilon_0 lB + C_3$.

As will be appreciated from the foregoing equations, the frequency oscillation cycle period T is proportional to the relative displacement stroke x. Therefore, by monitoring the frequency oscillation cycle period T, the stroke x can be detected.

Here, the diameters $\phi d_1$ through $\phi d_8$ can vary depending upon the temperature of the atmosphere, due to thermal expansion. Among those variable dimensions, the radios $\phi d_3/\phi d_2$ and $\phi d_7/\phi d_6$ are regarded constant despite various rates of thermal expansions. Similarly, the radios $\phi d_4/\phi d_1$ and $\phi d_8/\phi d_5$ are regarded as constant.

On the other hand, the dielectric constants $\epsilon_1$ and $\epsilon_2$ of the gaseous dielectric material filled in the space defined in the cylindrical member and in the dielectric member 30 can be made substantially constant at any temperature range by appropriately selecting the materials. For example, the dielectric material which exhibits a stable dielectric constant in relation to temperature variation may be selected among air or resin, such as polyacetal resin or polypropylene resin. Therefore, as the gaseous dielectric material, air may be used in the preferred embodiment so as to avoid influence of temperature variation and to obtain a stable dielectric constant thereof.

However, as the dielectric material for forming the dielectric member 30, a material which can provide higher resolution the measurement of the relative stroke between the rod member and the cylindrical member, is preferred. In order to obtain higher resolution, greater electrostatic capacity becomes necessary. This, in turn, requires a higher dielectric constant of the dielectric material forming the dielectric member 30. A satisfactorily high dielectric constant is obtainable by utilizing inorganic material, such as mica. Such inorganic material is known to have a substantially high dielectric constant but is expensive material and is difficult material for machining and/or mass-production. On the other hand, synthetic resins are less expensive and are easy for forming a desired shape. However, synthetic resins generally have a low or insufficient dielectric constant unlike what is required for the stroke sensor of the type disclosed hereabove.

In this view, the preferred embodiment of the stroke sensor, according to the present invention, employs a composite dielectric material which is a composition of synthetic resin material and inorganic material. As a resin material to form the composition, thermoplastic resin, such as polypropylene, polyacetal, polybuthylene terephtalate, polyphenylene surfide and so forth are preferred in view of solubility with the inorganic material. As inorganic material, ceramics are used. Temperature characteristics of dielectric constants of various compositions will be discussed herebelow.

(1) Polypropylene

The relative dielectric constant of polyphropylene is 2.3 which is not satisfactorily high. Temperature dependency and frequency dependency of the relative dielectric constant of polypropylene is substantially low among various thermoplastic resins. In order to form the composition with polypropylene as a resin material, a ceramic which has a satisfactorily high dielectric constant and has temperature dependency and frequency dependency as low as possible is required. As a ceramic satisfying the foregoing requirement, the $CaTiO_3$-$Bi_4Ti_3O_{12}$ system, i.e. mixed crystal system, can be used. Such a ceramic has a dielectric constant greater than 100 which is satisfactorily high. In addition, such a ceramic has a temperature coefficient of $\pm 30$ ppm/°C. which is satisfactorily small and has satisfactorily low frequency dependency.

In the preferred composition, polypropylene and $CaTiO_3$-$Bi_4Ti_3O_{12}$ are mixed in a ratio of 1:9 by volume.

In the alternative embodiment, $TiO_2$-$CaTiSiO_8$ system (mixed crystal system) ceramic can be used as the inorganic material to form the composition. This ceramic has a dielectric constant of 80 to 90, a temperature coefficient of the dielectric constant of $\pm 20$ ppm/°C. and a substantially low frequency dependency. In this case, the preferred composition is a mixture of polypropylene and $TiO_2$-$CaTiSiO_8$ in a ratio of 1:9 by volume.

(2) Polyacetal

The dielectric constant of polyacetal is 3.7 which is sufficient for sole use in the stroke sensor of the present invention. Polyacetal has essentially linear temperature dependency of the dielectric constant of has a temperature coefficient of about $+4.9 \times -10^{-4}$/°C., which is relatively smaller than that of other thermoplastic resins. Furthermore, polyacetal has a substantially low frequency dependency.

In order to form the composition with polyacetal set forth above, $TiO_2$ system ceramics may be used. $TiO_2$ system ceramics have dielectric constants of about 90. On the other hand, $TiO_2$ system ceramics have temperature coefficients of about $-8 \times 10^{-4}$/°C. and have a substantially low frequency dependency.

As seen from the above, the sign of the temperature coefficients of polyacetal and $TiO_2$ system ceramics are opposite to each other, and their absolute values are 4.9:8. Such opposite temperature dependency in the components of the composition may interfere with each other to reduce the temperature coefficient of the composition.

In the preferred composition, polyacetal and $TiO_2$ system ceramics are mixed in a ratio of 2:8 by volume.

In the alternative, strontium titanate system ceramics can be used as the inorganic material. Strontium titanate has a dielectric constant about 170 to 430 and a temperature coefficient of $-2200$ to $-4600$ ppm/°C., when strontium titanate is used for forming the composition by mixing with polyacetal at a given composite ratio. In the preferred composition, polyacetal and strontium titanate are mixed at a ratio of 2:8.

(3) Polyebutyene telephtalate (PBT)

The dielectric constant of polybuthylene telephtalate is 3.7 and the temperature coefficient is $+1620 \times 10^{-6}$/°C. To form the composition with polybuthylene telephtalate, ceramic material equivalent to that mixed with polyacetal as set forth above may be used as the inorganic material. In this case, the composite ratio of polybuthylene telephtalate and the ceramics as inorganic material is about 1:9.

(4) Polyphnylene surfide

The dielectric constant of polyphnylene surfide is 3.9 and the temperature coefficient is $+7.5 \times 10^{-4}$/°C. The dielectric constant values substantially in linar depending upon the temperature. In the preferred composition, the mixture rate of polyphnylene surfide and the ceramics which may be as set forth with respect to the inorganic material to be mixed with polyacetal. The mixture rate of polyphnylene surfide and the ceramics would be equivalent to that of polyacetal and the relevant ceramics.

These composite dielectric materials as shown in the foregoing examples may be preferred to form the dielectric material in the shown embodiment of the stroke sensor of FIGS. 1 and 2.

As will be appreciated from the foregoing discussion, since the preferred embodiment of the stroke sensor has no sensor component, such as a brush as in the prior art, slidingly contacting with a movable component of the combined cylindrical member and the rod member, durability of the sensor can be remarkably increased. In addition, the preferred embodiment of the stroke sensor has simplified construction but exhibits higher accuracy than that of the conventional art. Furthermore, by employing a dielectric member made of a preferred composite material. A higher dielectric constant can be obtained while lowering the temperature dependency and frequency dependency. This results in higher accuracy of measurement of the relative stroke between the cylindrical member and the rod member. On the other hand, since the preferred composite dielectric material has a satisfactorily great dielectric constant, higher resolution in measurement of the relative stroke can be obtained and higher precision in measurement can be obtained.

The stroke sensor according to the present invention is applicable to an automotive suspension system for monitoring relative displacement between a vehicle body and a suspension member, for example.

As will be appreciated herefrom, the invention fulfills all of the objects and advantages sought therefor.

What is claimed is:

1. An electrostatic capacity-type stroke sensor for monitoring relatively displaceable first and second structural members, comprising:

a cylindrical sensor casing secured to said first structural member and defining an internal sensor chamber therein;

a rod member thrustingly disposed within said cylindrical sensor casing for displacement relative to said cylindrical sensor casing according to movement of said second structural member;

a first electrode member fixed to said cylindrical casing and arranged within said sensor chamber and extending substantially in parallel to the axis of said rod member, said first electrode member forming a first electrode; and a second electrode member made of a dielectric material and movable with said rod member relative to said first electrode member and constituting a second electrode for establishing an electrostatic capacity with said first electrode member, said electrostatic capacity varying depending upon a relative position of said first and second electrode members and indicative of a relative position of said first and second structural members;

said dielectric material comprising materials having opposite dielectric temperature variation characteristics so that the influence of temperature on dielectric properties of said dielectric material is minimized.

2. A stroke sensor as set forth in claim 1, wherein said second electrode member is arranged in opposition to said first electrode member for varying the magnitude of overlapping with said first electrode member according to said relative position of said first and second structural members and for varying said electrostatic capacity formed therebetween.

3. A stroke sensor as set forth in claim 2, wherein said first and second electrode members are formed into cylindrical configurations and have mutually different diameters so that said first and second electrode members are coaxially arranged within said sensor chamber to define an annular clearance therebetween.

4. A stroke sensor as set forth in claim 1, wherein said sensor chamber defined in said cylindrical sensor casing is sealingly enclosed and filled with a gaseous state dielectric material.

5. A stroke sensor as set forth in claim 1, wherein said dielectric material forming said second electrode member is a synthetic resin.

6. A stroke sensor as set forth in claim 5, wherein said dielectric material forming said second electrode member comprises polyacetal resin or polypropylene resin.

7. A stroke sensor as set forth in claim 5, wherein said dielectric material forming said second electrode material is a composition of a synthetic resin and an inorganic material.

8. A stroke sensor as set forth in claim 7, wherein said synthetic resin comprises polypropylene, polyacetal, polybuthylene telephtalate or polyphnylene surfide.

9. A stroke sensor as set forth in claim 8, wherein said inorganic material is a mixed crystal system ceramic.

10. A stroke sensor as set forth in claim 9, wherein said mixed crystal system ceramic comprises $CaTiO_3$-$Bi_4Ti_3O_{12}$ system ceramics, $TiO_2$-$CaTiSiO_5$ system ceramics, $TiO_2$ system ceramics, or strontium titanate.

11. An electrostatic capacity-type stroke sensor for monitoring relatively displaceable first and second structural members, comprising:
   a cylindrical sensor casing secured to said first structural member and defining an internal sensor chamber therein;
   a rod member thrustingly disposed within said cylindrical sensor casing for displacement relative to said cylindrical sensor casing according to movement of said second structural member;
   a first cylindrical member fixed to said cylindrical sensor casing and arranged within said sensor chamber and extending substantially in parallel to the axis of said rod member, said first cylindrical member forming a first electrode; and
   a second cylindrical member made of a dielectric material and coaxially arranged with said first cylindrical member for varying an overlapping magnitude depending upon a relative position of said first and second structural members, said second cylindrical member being movable with said rod member relative to said first cylindrical member and constituting a second electrode for establishing an electrostatic capacity with said first cylindrical member, said electrostatic capacity varying depending upon said overlapping magnitude of said first and second cylindrical members and indicative of said relative position of said first and second structural members;

said dielectric material comprising materials having opposite dielectric temperature variation characteristics so that the influence of temperature on dielectric properties of said dielectric material is minimized.

12. A stroke sensor as set forth in claim 11, wherein said sensor chamber defined in said cylindrical sensor casing is sealingly enclosed and filled with a gaseous state dielectric material.

13. A stroke sensor as set forth in claim 11, wherein said dielectric material forming said second electrode member is a synthetic resin.

14. A stroke sensor as set forth in claim 13, wherein said dielectric material forming said second electrode member comprises polyacetal resin or polypropylene resin.

15. A stroke sensor as set forth in claim 13, wherein said dielectric material forming said second electrode material is a composition of a synthetic resin and an inorganic material.

16. A stroke sensor as set forth in claim 15, wherein said synthetic resin comprises polypropylene, polyacetal, polybuthylene telephtalate or polyphnylene surfide.

17. A stroke sensor as set forth in claim 16, wherein said inorganic material is a mixed crystal system ceramic.

18. A stroke sensor as set forth in claim 17, wherein said mixed crystal system ceramic comprises $CaTiO_3$-$Bi_4Ti_3O_{12}$ system ceramics, $TiO_2$-$CaTiSiO_5$ system ceramics, $TiO_2$ system ceramics, or strontium titanate.

19. An electrostatic capacity-type stroke sensor for monitoring relatively displaceable first and second structural members, comprising:
   a cylindrical sensor casing secured to said first structural member and defining an internal sensor chamber therein;
   a first sensor member rigidly connected with said first structural member, said first sensor member extending substantially in parallel to the axis of said cylindrical casing and forming a first electrode; and
   a second sensor member associated with said second structural member for displacement relative to said first sensor member according to a relative displacement between said first and second structural members and made of a dielectric material constituting a second electrode, said second sensor member being coaxially arranged with said first sensor member for varying an overlapping magnitude depending upon said relative position of said first and second structural members, said second sensor member establishing an electrostatic capacity with said first sensor member, said electrostatic capacity varying depending upon said overlapping magnitude with said first sensor member and indicative of said relative position of said first and second structural members;

said dielectric material comprising materials having opposite dielectric temperature variation characteristics so that the influence of temperature on dielectric properties of said dielectric material is minimized.

20. A stroke sensor as set forth in claim 19, wherein said second sensor member comprises a cylindrical member coaxially disposed within said cylindrical casing.

21. A stroke sensor as set forth in claim 19, wherein said sensor chamber defined in said cylindrical sensor casing is sealingly enclosed and filled with a gaseous state dielectric material.

22. A stroke sensor as set forth in claim 19, wherein said dielectric material forming said second electrode member is a synthetic resin.

23. A stroke sensor as set forth in claim 22, wherein said dielectric material forming said second electrode member comprises polyacetal resin or polypropylene resin.

24. A stroke sensor as set forth in claim 19, wherein said dielectric material forming said second electrode material is a composition of a synthetic resin and an inorganic material.

25. A stroke sensor as set forth in claim 24, wherein said synthetic resin and said inorganic material have opposite dielectric temperature variation characteristics.

26. A stroke sensor as set forth in claim 24, wherein said synthetic resin comprises polypropylene, polyacetal, polybuthylene telephtalate or polyphnylene surfide.

27. A stroke sensor as set forth in claim 26, wherein said inorganic material is a mixed crystal system ceramic.

28. A stroke sensor as forth in claim 27, wherein said mixed crystal system ceramic comprises $CaTiO_3$-$Bi_4Ti_3O_{12}$ system ceramics, $TiO_2$-$CaTiSiO_5$ system ceramics, $TiO_2$ system ceramics, or strontium titanate.

* * * * *